(12) United States Patent
Shelest et al.

(10) Patent No.: US 7,591,002 B2
(45) Date of Patent: Sep. 15, 2009

(54) CONDITIONAL ACTIVATION OF SECURITY POLICIES

(75) Inventors: Art Shelest, Sammamish, WA (US);
Carl M. Ellison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 11/150,819

(22) Filed: Jun. 9, 2005

(65) Prior Publication Data

US 2006/0282876 A1 Dec. 14, 2006

(51) Int. Cl.
*G06F 17/00* (2006.01)
(52) U.S. Cl. .......................................................... 726/1
(58) Field of Classification Search ...................... 726/1, 726/22; 380/277; 713/188
See application file for complete search history.

(56) References Cited

U.S. PATENT DOCUMENTS

| | | | | |
|---|---|---|---|---|
| 7,085,928 | B1 * | 8/2006 | Schmid et al. ............... | 713/164 |
| 7,373,659 | B1 * | 5/2008 | Vignoles et al. ............... | 726/11 |
| 2004/0220947 | A1 * | 11/2004 | Aman et al. ................. | 707/100 |
| 2006/0005227 | A1 | 1/2006 | Samuelsson et al. | |
| 2006/0048209 | A1 | 3/2006 | Shelest et al. | |
| 2006/0174318 | A1 | 8/2006 | Shelest | |

OTHER PUBLICATIONS

U.S. Appl. No. 11/039,637, filed Jan. 19, 2005, Shelest et al.

* cited by examiner

*Primary Examiner*—Matthew B Smithers
*Assistant Examiner*—Ali S Abyaneh
(74) *Attorney, Agent, or Firm*—Perkins Coie LLP (57) ABSTRACT

A conditional activation system distributes a security policy to the computer systems of an enterprise. Upon receiving a security policy at a computer system, the computer system may install the received security policy without activation. When a security policy is installed without activation, it is loaded onto a computer system but is not used to process security enforcement events. The computer system may then determine whether a security policy activation criterion has been satisfied and, if so, activate the security policy.

15 Claims, 8 Drawing Sheets

CONDITIONAL ACTIVATION OF SECURITY POLICIES

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of software systems including application programs or other computer programs executing on those computer systems. Developers of software systems and administrators of computer systems of an enterprise go to great effort and expense to identify and remove vulnerabilities. Because of the complexity of software systems, however, it is virtually impossible to identify and remove all vulnerabilities before software systems are released. After a software system is released, developers can become aware of vulnerabilities in various ways. A party with no malicious intent may identify a vulnerability and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to system administrators "patches" or updates to the software system that remove the vulnerability. If the vulnerability has not yet been exploited (e.g., might not be known to hackers), then a developer can design, implement, test, and distribute a patch in a disciplined way. If the vulnerability has already been widely exposed, then the developer may rush to distribute a patch without the same care that is used under normal circumstances. When patches are distributed to the administrators of the computer systems, they are responsible for scheduling and installing the patches to remove the vulnerabilities.

Unfortunately, administrators often delay the installation of patches to remove vulnerabilities for various reasons. When a patch is installed, the software system and possibly the computer system on which it is executing may need to be shut down and restarted. If the vulnerability is in a software system that is critical to the success of an enterprise, then the administrator needs to analyze the tradeoffs of keeping the software system up and running with its associated risk of being attacked and of shutting down a critical resource of the enterprise to install the patch. Some administrators may delay the installation of the patch because they fear that, because of a hasty distribution, it might not be properly tested and have unintended side effects. If the patch has an unintended side effect, then the software system, the computer system, or some other software component that is impacted by the patch may be shut down or made to fail by the patch itself. Administrators need to factor in the possibility of an unintended side effect when deciding whether to install a patch. These administrators may delay installing a patch until experience by others indicates that there are no serious unintended side effects.

Intrusion detection systems have been developed that can be used to identify whether an attempt is being made to exploit a known vulnerability that has not yet been patched. These intrusion detection systems can be used to prevent exploitations of newly discovered vulnerabilities for which patches have not yet been developed or installed. These intrusion detection systems may define a "signature" for each way a vulnerability can be exploited. For example, if a vulnerability can be exploited by sending a certain type of message with a certain attribute, then the signature for that exploitation would specify that type and attribute. When a security enforcement event occurs, such as the receipt of a message, the intrusion detection system checks its signatures to determine whether any match the security enforcement event. If so, the intrusion detection and/or prevention system may take action to prevent the exploitation, such as dropping the message.

The collection of signatures for an enterprise forms part of the security policy of that enterprise. An enterprise may have many different security policies which are collectively referred to as the security policy of the enterprise. A security policy is typically expressed as rules that each have a condition indicating when the rule is satisfied and one or more actions to be performed when the rule is satisfied. The condition of a rule may include signatures or other detection criteria. The condition, action, and exception of the rules may be specified as expressions. A rule may be semantically expressed as "IF conditions THEN actions EXCEPT exceptions." Conditions of a rule are expressions of circumstances under which security enforcement actions of the rule are to be performed. An action is an expression of activity to be performed when the condition is satisfied. A rule may have multiple actions. An exception is an expression of when the actions may not be performed even though the condition is satisfied. A condition may be either static or dynamic. A static condition is one which refers, for example, to a hard-coded list of files. A dynamic condition is one which, for example, performs a query to determine a list of files matching a provided criterion. Security enforcement actions may include allowing a request that caused the security enforcement event, denying the request, soliciting input from a user, notifying the user, and so on. Other rule constructs are also possible. As an example, an "else" construct could be added to perform alternate actions when a condition is false. A security engine may be responsible for receiving security enforcement events and applying the rules of the security policy of the enterprise.

Security policies are typically distributed by the developers of the security policies to the administrators of enterprises for implementation on the computer systems of the enterprises. After the administrators have tested the security policy, the security policy is distributed to the computer systems of the enterprise. When the computer systems of the enterprise receive the security policies, the computer systems start enforcing the received security policies. Because an enterprise may have thousands of computer systems, it can take a considerable amount of time to distribute the security policies. In addition, because some computer systems may be offline at the time of distribution (e.g., a laptop not connected to the network or a desktop that is turned off), not all computer systems will receive the security policy. As a result, some computer systems of the enterprise may start enforcing the security policies before other computer systems. This staggered enforcement of security policies may present problems, especially when a security policy was not tested in an environment where some computer systems enforce the security policy, but others do not.

Administrators often delay distribution of security policies for many of the same reasons that they delay the distribution of patches to remove vulnerabilities. In particular, the administrators may fear that the security policies have not been properly tested (especially in the environment of the enterprise) and may have unintended side effects. If a security policy has an unintended side effect, then critical software systems of the enterprise may be adversely affected. Moreover, once a security policy is distributed to the computer systems of the enterprise, it can be difficult to retract a security policy when the unintended side effects adversely affect the critical systems.

SUMMARY

A method and system for conditionally activating a security policy is provided. A conditional activation system may distribute a policy to the computer systems of an enterprise. Upon receiving a policy at a computer system, the computer system may install the received policy without activation. When a policy is installed without activation, it is loaded onto a computer system but is not used to process enforcement events. The computer system may then determine whether a policy activation criterion has been satisfied. If so, the computer system activates the policy so that it may be enforced. In this way, the distribution and activation of policies can occur at different times to help minimize the adverse effects of staggered enforcement of the policy. The conditional activation system may also allow the same policy to be deactivated and reactivated based on various criteria.

An activation system allows a policy, such as a security policy, to be distributed and activated in a simulation mode, rather than in a normal mode. When a security policy is activated in a simulation mode, the security policy is applied to security enforcement events, but the actions of rules whose conditions are satisfied are not performed. When a security policy is activated in a simulation mode, a security engine may record a log of security enforcement events along with the rules of the security policy whose conditions are satisfied by the security enforcement events. The computer systems of the enterprise can provide their logs to an administrator to determine what the effects of the security policy would have been if the security policy had been activated in normal mode. If the effects would have been adverse, then the administrator may revise and redistribute the security policy to be activated in simulation mode or in normal mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for conditionally activating a security policy is provided. In one embodiment, a conditional activation system may include an administrative component and an activation component. The administrative component executing on an administrative server may distribute a security policy to the computer systems of an enterprise. Upon receiving a security policy at a computer system, the activation component executing on the computer system may install the received security policy without activation. When a security policy is installed without activation, it is loaded onto a computer system but is not used to process security enforcement events. The activation component may then determine whether a security policy activation criterion has been satisfied. If so, the activation component activates the security policy so that it may be enforced on the computer system on which it is installed. Many different security policy activation criteria may be used. For example, the security policy activation criterion may be the sending of a message from an administrative computer system to each computer system on which the security policy has been installed. Upon receiving the message, the activation component activates the security policy so that it will be enforced on the computer system. Thus, an administrator can distribute a security policy to the computer systems of an enterprise and at a later time send a message to each computer system to activate the security policy. This delayed activation of the security policy may allow sufficient time for the security policy to be distributed and installed on all the computer systems of an enterprise before starting to enforce the security policy. Another example of a security policy activation. criterion is an activation time. When the administrative component distributes the security policy, it may indicate a time at which the security policy should be activated on the computer systems in the absence of receiving instructions to the contrary. For example, a security policy may be distributed to the computer systems of an enterprise on April 15th with an indication to activate the security policy on May 1. In this way, the distribution and activation of security policies can occur at different times to help minimize the adverse effects of staggered enforcement of the security policy.

In one embodiment, an activation system may allow a security policy to be distributed and activated in a simulation mode, rather than in a normal mode. When a security policy is activated in a simulation mode, the security policy is applied to security enforcement events, but the actions of rules whose conditions are satisfied are not performed. For example, if the condition of a rule is satisfied when an FTP request is received and the action is to discard the request, then when in simulation mode an FTP request is received, the condition would be determined to be satisfied but the FTP request would not be discarded. When a security policy is activated in a simulation mode, a security engine may record a log of security enforcement events along with the rules of the security policy whose conditions are satisfied by the security enforcement events. The computer systems of the enterprise can provide their logs to an administrative computer system. An administrator may then analyze the logs to determine what the effects of the security policy would have been if the security policy had been activated in normal mode. If the effects would have been adverse, then the administrator may revise and redistribute the security policy. Alternatively, the administrator may decide to uninstall the security policy or to never send an activate in normal mode message. In this way, an administrator can analyze the effects of a security policy on the computer systems of an enterprise before the security policy is enforced.

In one embodiment, the conditional activation system may allow an administrator to define the security policy activation criterion. As discussed above, the security policy activation criterion may be satisfied when an activation message is received from an administrator or may be satisfied at an activation time. The security policy activation criterion may be satisfied when an activation flag is set on an administrative computer system. The activation component may periodically poll the administrative computer system to determine whether the activation flag is set. If set, the activation component activates the security policy. When an activation component receives an indication to activate a security policy (e.g., via an activation message or an activation flag), it may authenticate the source of the indication to ensure that the activation indication is legitimate. For example, an activation message may be encrypted using a private key of an administrator and decrypted using the public key of the administrator to ensure that it was indeed sent from the administrator. When an activation component receives an indication to activate a security policy, it may also receive a parameter for controlling the enforcement of the security policy. For example, when an activation message is received, it may include a list of banned domains from which all communications are to be discarded by the security engine. Thus, the conditional activation system can be used to distribute parameters for dynamic conditions of rules. As another example, the security policy activation criterion may be satisfied based on attributes of the computer system on which the security policy is installed. For example, the security policy activation criterion may be satisfied when a certain application program is installed on the computer system. As another example, the security policy activation criterion may be satisfied when a certain number of logon attempts are received, a high number of messages are discarded, and so on. For example, if the computer system includes a critical server system and a non-critical server system, the security policy activation criterion may be satisfied when the critical server system is not receiving enough of the CPU's time. In such a case, the security policy that is activated may discard requests for services from the non-critical server system. This may allow the critical server system to start to receive the needed CPU time. In such a case, the conditional activation system may activate increasingly restrictive security policies until the desired attributes of the computer system are attained.

In addition to activating security policies, the conditional activation system may also be used to deactivate security policies. For example, an administrator may determine that an activated security policy is having an adverse effect on critical software systems. To minimize the adverse effect, the administrator may send a deactivate message to each of the computer systems on which the security policy is installed. Upon receiving the deactivation message, the activation component deactivates the security policy so that it is no longer enforced. More generally, the conditional activation system may specify a security policy deactivation criterion that when satisfied indicates that the security policy should be deactivated. The security policy deactivation criterion may be based on attributes of the computer system on which the security policy is installed. For example, as discussed above with respect to CPU time allocated to a critical server system, the activated security policy may be deactivated when the CPU time allocated to the critical server system is sufficient. In one embodiment, an activation component may notify the administrative component whenever security policies are activated or deactivated.

Figure 1:
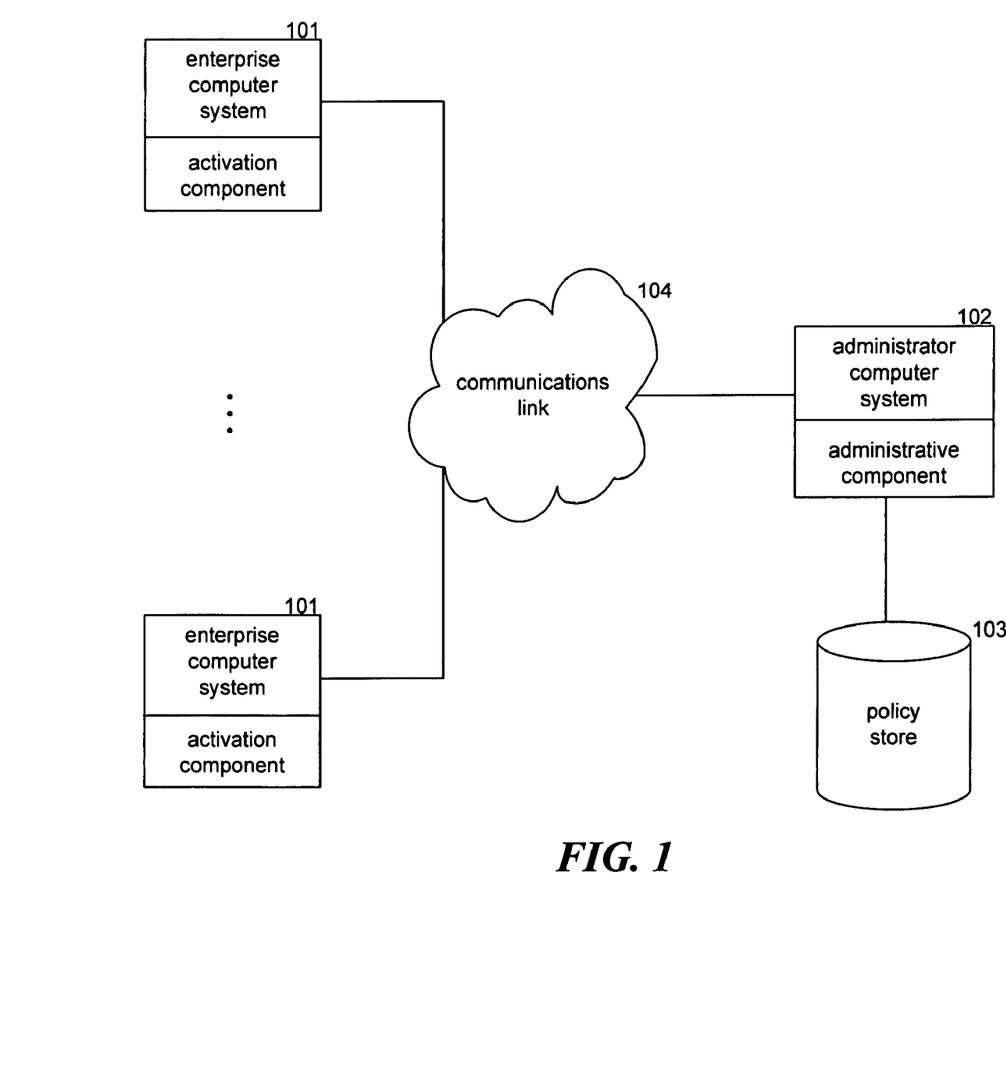
FIG. 1 is a block diagram that illustrates a network of an enterprise that uses the conditional activation system in one embodiment.

FIG. 1 is a block diagram that illustrates a network of an enterprise that uses the conditional activation system in one embodiment. Enterprise computer systems 101 are connected via communications link 104 to each other and to administrative computer system 102. The enterprise computer systems include an activation component for controlling the receiving, installing, and activating of security policies. The administrative computer system includes an administrative component and a policy store 103. The administrative component coordinates the distributing of security policies to the enterprise computer systems and establishing of the security policy activation and deactivation criteria. Because the conditional activation system separates the distribution of a security policy from its activation, an enterprise can use different communication techniques to distribute security policies and activation messages. For example, an enterprise may use a low-speed communications channel to distribute the security policy well in advance of its intended activation and then at a later time use a high-speed communications channel to send an activation message to each enterprise computer system. In addition, a publisher/subscriber model may be used to distribute activation and deactivation messages to enterprise computer systems. In such a case, each enterprise computer system would subscribe to activation and deactivation flags of the administrator. When a flag is changed by the administrator, the change is published to the subscribing computer systems. The conditional activation system may support the conditional activation/deactivation of multiple security policies. In such case, the activation indications and deactivation indications identify the security policy to which they apply.

Figure 2:
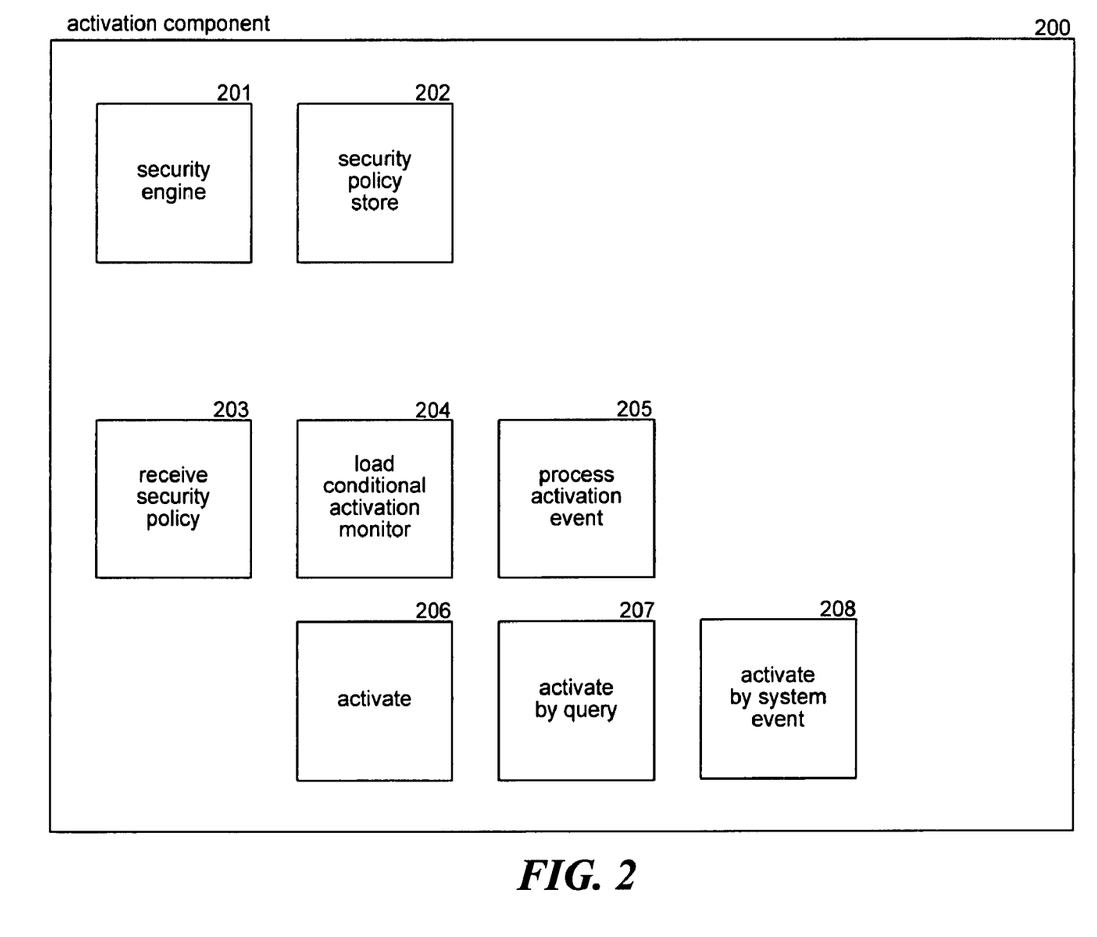
FIG. 2 is a block diagram that illustrates components of the activation component of the conditional activation system in one embodiment.

FIG. 2 is a block diagram that illustrates components of the activation component of the conditional activation system in one embodiment. The activation component 200 may include a security engine 201 and a security policy store 202. The security policy store contains the installed security policies. The security engine receives security enforcement events, determines which security policies are activated, and applies the rules of the activated security policies to the security enforcement events. If a security policy is activated in the simulation mode, then the security engine may create a log of the rules whose conditions are satisfied and prevent the actions of those rules from being performed. Each security policy of the security policy store may have an activation flag and an activation mode to specify whether the security policy is activated and if so, its mode of activation. The activation component also includes a receive security policy component 203, a load conditional activation monitor component 204, and a process activation event component 205. The receive security policy component receives new security policies and installs them by storing them in the security policy store. The receive security policy component also invokes the load conditional activation monitor component so that the activation component can monitor various events to determine when the security policy activation criterion is satisfied. For example, the activation monitor may register to receive an event at the activation time of a security policy activation criterion, when the CPU utilization of a critical server is below a certain amount, when a certain message is received, and so on. The process activation event component is invoked to process the activation events. The process activation event component invokes the activate component 206, the activate by query component 207, and the activate by system event component 208 to activate a security policy as appropriate. The activate component activates the security policy. The activate by query component submits a query (e.g., to an administrative server) to determine whether a security policy should be activated. The activate by system event component is invoked to activate the security policy as indicated by a system event.

The computing device on which the conditional activation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the conditional activation system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the conditional activation system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computing devices of an enterprise may be cell phones, personal digital assistants, smart phones, personal computers, programmable consumer electronics, digital cameras, and so on.

The conditional activation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
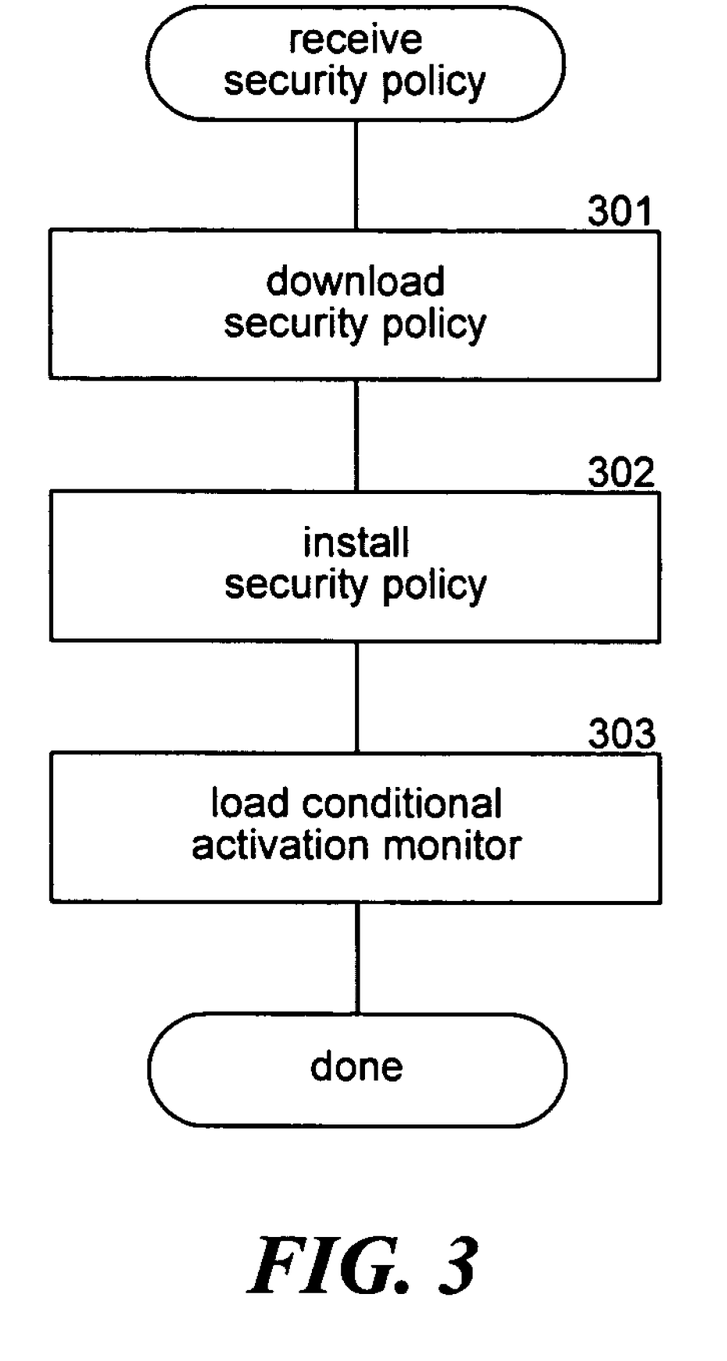
FIG. 3 is a flow diagram that illustrates the processing of the receive security policy component in one embodiment.

FIG. 3 is a flow diagram that illustrates the processing of the receive security policy component in one embodiment. The component is invoked to receive a security policy from the administrative component of the conditional activation system. In block 301, the component downloads the security policy from an administrative computer system. In block 302, the component installs the security policy in the security policy store. In block 303, the component loads the conditional activation monitor to determine when the security policy activation criterion is satisfied. The component then completes.

Figure 4:
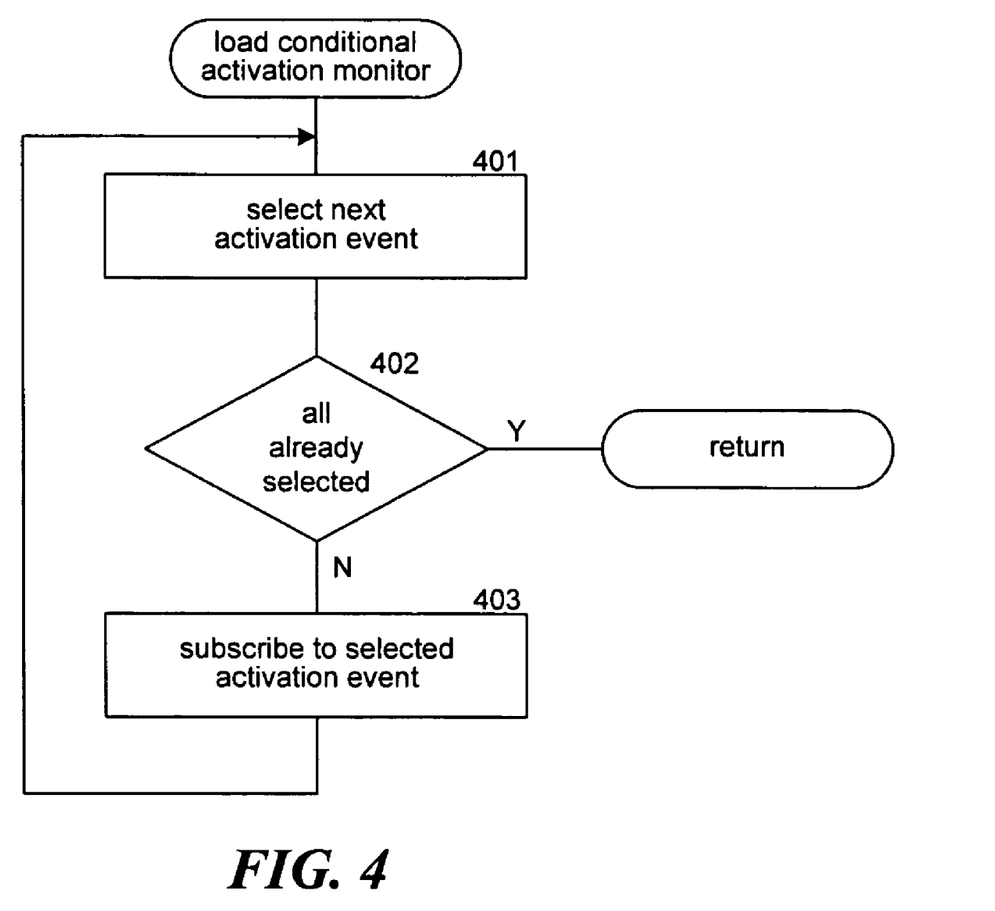
FIG. 4 is a flow diagram that illustrates the processing of the load conditional activation monitor component in one embodiment.

FIG. 4 is a flow diagram that illustrates the processing of the load conditional activation monitor component in one embodiment. The component loops registering various events that are used to determine whether the security policy activation criterion is satisfied. In block 401, the component selects the next activation event. In decision block 402, if all the activation events have already been selected, then the component returns, else the component continues in block 403. In block 403, the component subscribes to the selected activation event and then loops to block 401 to select the next activation event.

Figure 5:
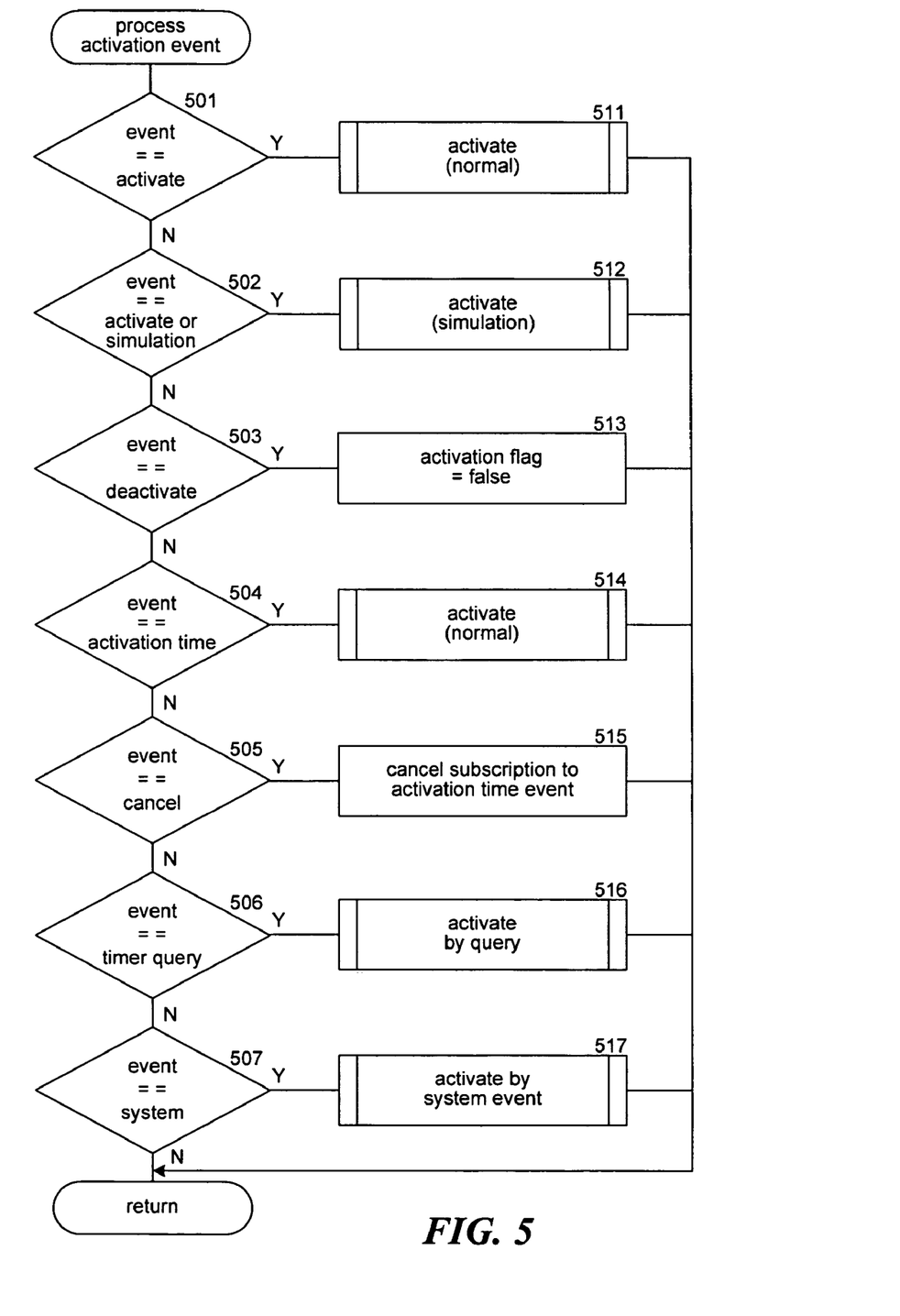
FIG. 5 is a flow diagram that illustrates the processing of the process activation event component in one embodiment.

FIG. 5 is a flow diagram that illustrates the processing of the process activation event component in one embodiment. The component is invoked to process events that the activation component has registered to receive. In blocks 501-507, the component determines the type of event and continues at blocks 511-517 to process the event. In decision block 501, if the event indicates to activate the security policy, then the component invokes the activate component in block 511 and then returns. In decision block 502, if the event indicates to activate for simulation, then the component invokes the activate component passing an indication of the simulation mode in block 512 and then returns. In decision block 503, if the event indicates to deactivate the security policy, then the component sets the activation flag for the security policy to false in block 513 and then returns. In decision block 504, if the event indicates that an activation time has occurred, then the component invokes the activate component in block 514 and then returns. In decision block 505, if the event indicates to cancel the activation of a security policy that is not yet activated, then the component cancels the subscription to the activation time event in block 515 and then returns. In decision block 506, if the event indicates that it is time to perform a query to determine whether to activate the security policy, then the component invokes the activate by query component in block 516 and then returns. In decision block 507, if the event indicates that it is a system event, then the component invokes the activate by system event component in block 517. The component then returns.

Figure 6:
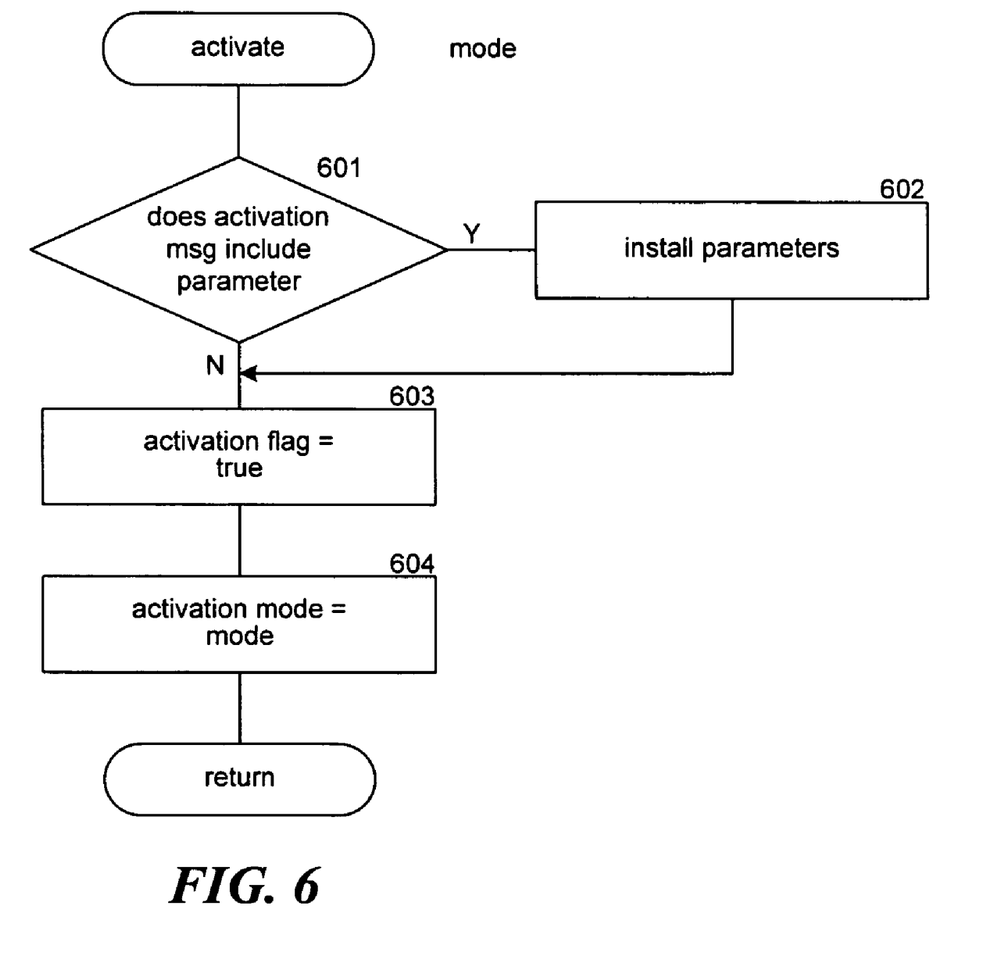
FIG. 6 is a flow diagram that illustrates the processing of the activate component in one embodiment.

FIG. 6 is a flow diagram that illustrates the processing of the activate component in one embodiment. The component is passed an indication of the activation mode and activates the security policy accordingly. In decision block 601, if the activation message includes parameters of the security policy, then the component installs the parameters in block 602, else the component continues at block 603. In block 603, the component sets the activation flag for the security policy to true. In block 604, the component sets the activation mode to the passed mode and then returns.

Figure 7:
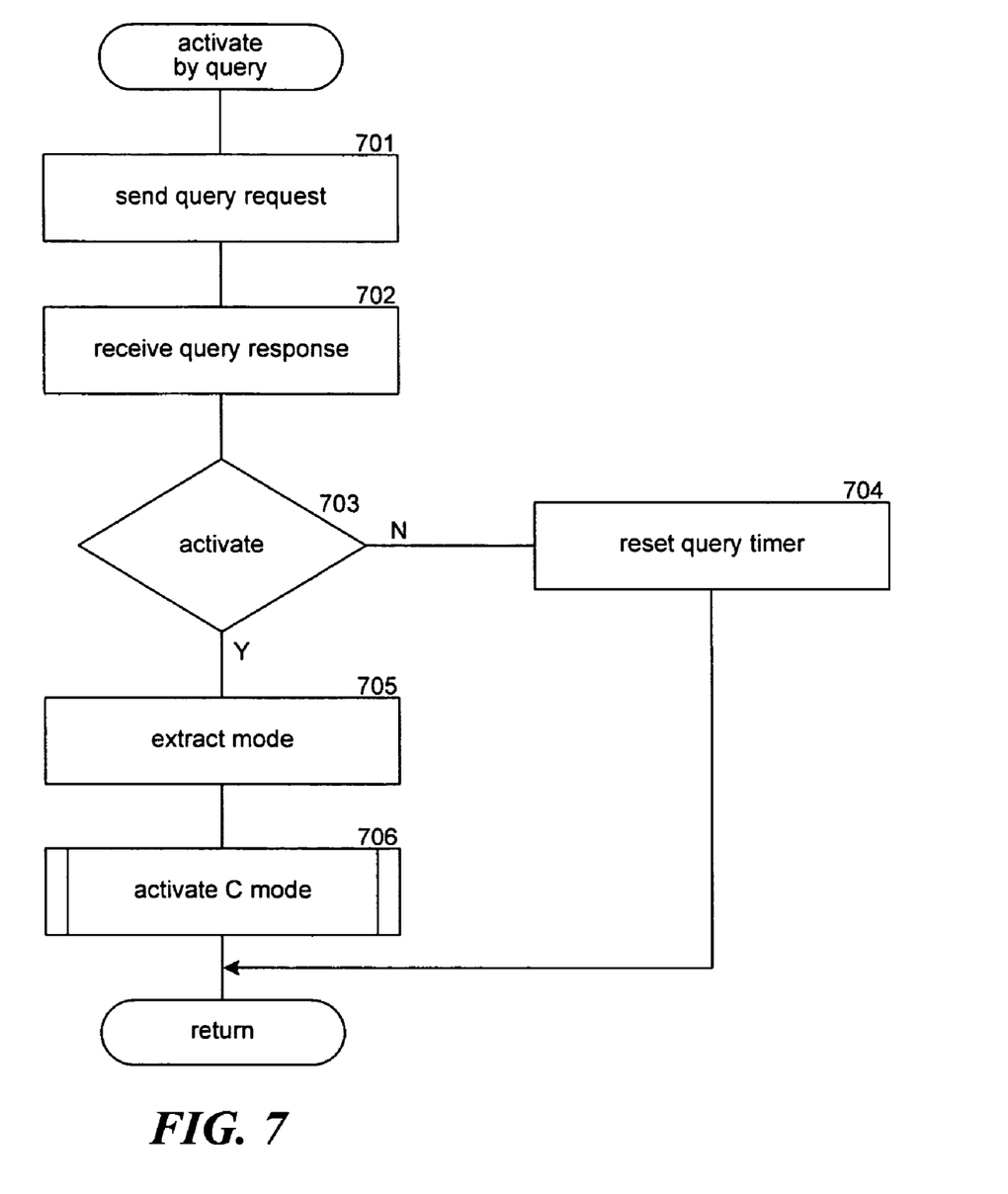
FIG. 7 is a flow diagram that illustrates the processing of the activate by query component in one embodiment.

FIG. 7 is a flow diagram that illustrates the processing of the activate by query component in one embodiment. The component is invoked when it is time to submit a query or otherwise check a flag to determine whether the security policy should be activated. In block 701, the component sends the query request to the administrative computer system. In block 702, the component receives the response from the administrative computer system. In decision block 703, if the response indicates to activate the security policy, then the component continues at block 705, else the component continues at block 704. In block 704, the component resets an event timer so that the query can be submitted later and then returns. In block 705, the component determines the activation mode. In block 706, the component invokes the activate component passing the activation mode and then returns.

Figure 8:
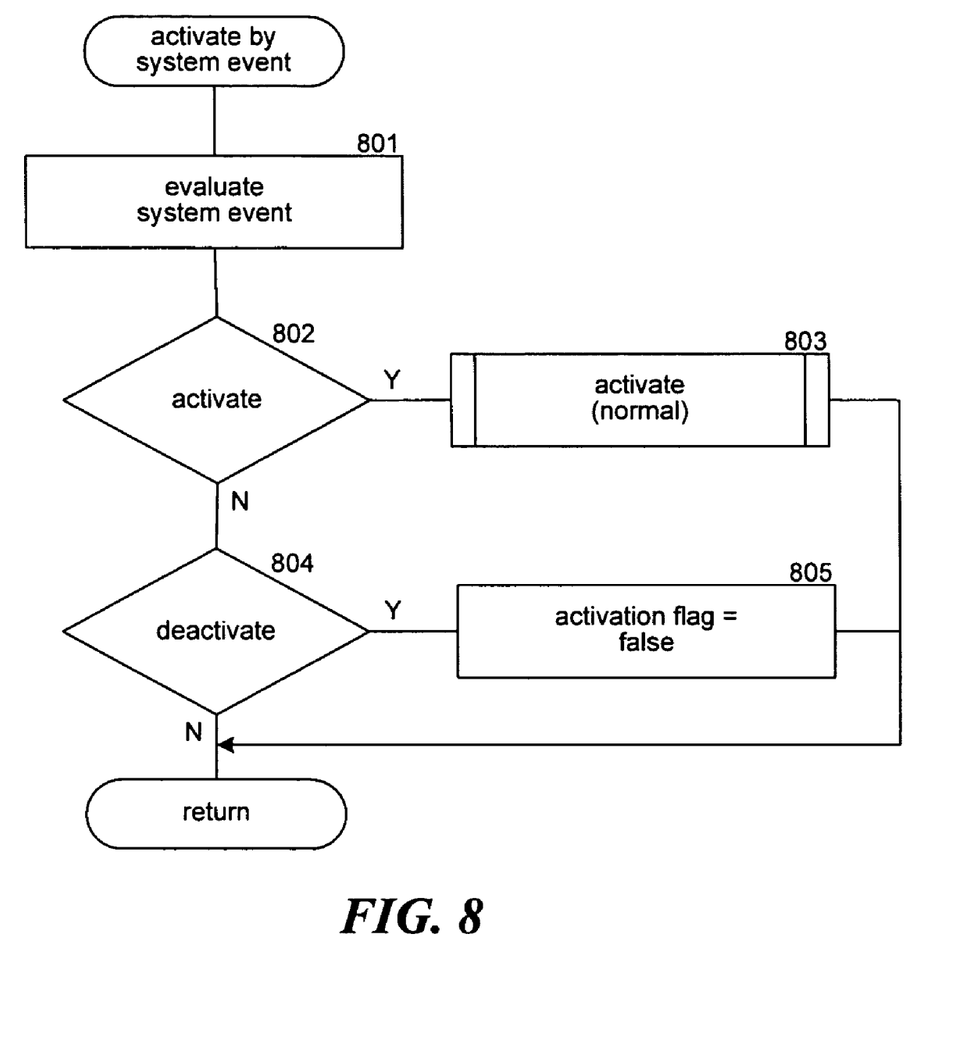
FIG. 8 is a flow diagram that illustrates the processing of the activate by system event component in one embodiment.

FIG. 8 is a flow diagram that illustrates the processing of the activate by system event component in one embodiment. The component is invoked when a system event occurs that may indicate that that security policy activation criterion has been satisfied. In block 801, the component evaluates the system event to determine whether the security policy should be activated or deactivated. In decision block 802, if the security policy should be activated, then the component invokes the activate component in block 803 and then returns, else the component continues at block 804. In decision block 804, if the security policy should be deactivated, then the component sets the activation flag to false in block 805. The component then returns.

From the foregoing, it will be appreciated that specific embodiments of the conditional activation system have been described herein for purposes of illustration, but that various modifications may be made without deviating from the spirit and scope of the invention. For example, the conditional activation aspects and the simulation mode aspects of the activation system can be used independently or in combination. Also, the activation system can be used with policies that are not related to security. Examples of policies that might not be security-related include a policy that prohibits users from accessing certain web sites (e.g., sports-related), a policy that specifies only certain advertising literature is to be sent to customers after a certain date, a policy that specifies an internal approval process within an organization, and so on. Accordingly, the invention is not limited except as by the appended claims.

We claim:

1. A method in a computing device for activating a policy having rules with conditions and actions, the method comprising:
   receiving a policy;
   installing the received policy without activation;
   determining by the computing device whether a policy activation criterion has been satisfied that indicates to activate the policy in either normal mode or simulation mode;
   when it is determined that the policy activation criterion has been satisfied to activate the policy in normal mode, activating the policy in normal mode so that when a rule of the policy is applied to a security enforcement event and the condition of the rule is satisfied, performing the action of the rule; and
   when it is determined that the policy activation criterion has been satisfied to activate the policy in simulation mode, activating the policy in simulation mode;
      when a rule of the policy activated in simulation mode is applied to a security enforcement event and the condition of the rule is satisfied,
         suppressing the performing of the action of the rule; and
         logging an indication of the security enforcement event and the rule whose condition was satisfied by the security enforcement event for evaluating effectiveness of the policy based on the logged indications; and
      upon receiving an indication to switch from simulation mode to normal mode based on effectiveness of the policy, activating the policy in normal mode.

2. The method of claim 1 wherein the policy activation criterion is satisfied based on a message received from an administrative server to activate the policy so that the administrative server can activate policies previously installed at multiple computing devices at the same time by sending a message to the computing devices.

3. The method of claim 2 wherein the message includes a parameter for controlling a dynamic condition of a rule of the policy so that the dynamic condition of the rules is satisfied based on the parameter included in the message.

4. The method of claim 2 wherein the policy is received via a communications mechanism and the message is received via a different communications mechanism.

5. The method of claim 1 wherein the policy activation criterion is satisfied at an activation time.

6. The method of claim 5 including receiving a message to cancel the activation of the policy at the activation time.

7. The method of claim 1 wherein the policy is a security policy and the policy activation criterion is satisfied based on performance statistics of the computer system, a performance statistic indicating that a critical system of the computing device is not receiving enough central processing time.

8. The method of claim 1 including determining whether a policy deactivation criterion is satisfied and when it is determined that the policy deactivation criterion is satisfied, deactivating the policy.

9. The method of claim 1 wherein the mode is switched to normal after the security policy has been tested in simulation mode.

10. The method of claim 1 wherein when the policy is activated in simulation mode, it can be activated in normal mode and when the policy is in normal mode, it can be activated in simulation mode.

11. The method of claim 1 wherein the determining whether the policy activation criterion is satisfied includes accessing a server.

12. A computer-readable storage medium containing instructions for controlling a computing device to activate a security policy having rules and conditions, by a method comprising:
   receiving a security policy;
   installing the received security policy without activating the installed security policy wherein a security policy that is not activated is not enforced on the computing device;
   determining whether a policy activation criterion has been satisfied that indicates to activate the security policy in either normal mode or simulation mode;
   when it is determined that the security policy activation criterion has been satisfied to activate the security policy in normal mode, activating the security policy in normal mode; and
      when a rule of the security policy activated in normal mode is applied to a security enforcement event and the condition of the rule is satisfied, enforcing the security policy on the computing device by performing the action of the rule; and
   when it is determined that the security policy activation criterion has been satisfied to activate the security policy in simulation mode, activating the security policy in simulation mode; and
      when a rule of the security policy activated in simulation mode is applied to a security enforcement event and the condition of the rule is satisfied, not enforcing the security policy on the computing device by suppressing the performing of the action of the rule and logging an indication of the security enforcement event and the rule whose condition was satisfied by the security enforcement event for evaluating effectiveness of the security policy based on the logged indications: and
      upon receiving an indication to switch from simulation mode to normal mode based on effectiveness of the security policy, activating the security policy in normal mode.

13. The computer-readable storage medium of claim 12 wherein the security policy activation criterion is satisfied based on a message is received from an administrative server to activate the security policy so that the administrative server can activate security policies previously installed at multiple computing devices at the same time by sending a message to the computing devices.

14. The computer-readable storage medium of claim 12 wherein the security policy activation criterion is satisfied at an activation time unless an indication to cancel the activation is received before the activation time.

15. The computer-readable storage medium of claim 12 wherein the security policy activation criterion is satisfied based on performance statistics of the computer system, a performance statistic indicating that a critical system of the computing device is not receiving enough central processing time.

* * * * *

UNITED STATES PATENT AND TRADEMARK OFFICE
CERTIFICATE OF CORRECTION

PATENT NO.       : 7,591,002 B2
APPLICATION NO.  : 11/150819
DATED            : September 15, 2009
INVENTOR(S)      : Shelest et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Twenty-first Day of September, 2010

David J. Kappos
*Director of the United States Patent and Trademark Office*